(12) United States Patent
Vasudevan et al.

(10) Patent No.: US 9,710,438 B2
(45) Date of Patent: *Jul. 18, 2017

(54) ONLINE/OFFLINE PROTO LINK BEHAVIOR AND PROTO PAGE CONFLICT RESOLUTION

(71) Applicant: MICROSOFT TECHNOLOGY LICENSING, LLC, Redmond, WA (US)

(72) Inventors: Sripriya P. Vasudevan, Issaquah, WA (US); Peter Baer, Seattle, WA (US); David Garber, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 510 days.

This patent is subject to a terminal disclaimer.

(21) Appl. No.: 14/108,273

(22) Filed: Dec. 16, 2013

(65) Prior Publication Data

US 2014/0101525 A1 Apr. 10, 2014

Related U.S. Application Data

(63) Continuation of application No. 12/140,252, filed on Jun. 16, 2008, now Pat. No. 8,612,520.

(51) Int. Cl.
*G06F 15/16* (2006.01)
*G06F 17/22* (2006.01)
*G06F 17/30* (2006.01)

(52) U.S. Cl.
CPC .... *G06F 17/2235* (2013.01); *G06F 17/30011* (2013.01)

(58) Field of Classification Search
None
See application file for complete search history.

(56) References Cited

U.S. PATENT DOCUMENTS 5,220,657 A * 6/1993 Bly ............... G06F 17/30171
707/E17.007
6,065,026 A * 5/2000 Cornelia ............. G06F 17/24
715/202

(Continued)

FOREIGN PATENT DOCUMENTS

WO WO0133435 A1 5/2001

OTHER PUBLICATIONS

"Microsoft Office OneNote 2007 product overview", Microsoft Corporation, 2008.

(Continued)

*Primary Examiner* — Umar Cheema
*Assistant Examiner* — John Fan (57) ABSTRACT

Architecture that facilitates offline/online interaction with online collaboration documents or pages such as for wikis and/or notebooks. More specifically, for every proto link employed in a page, a unique object ID is provided. The client, whether online or offline, uses the object ID as the page's object ID when a target page is created at the time of resolving the associated proto link (e.g., when a user clicks on a proto link to navigate to the proto page). When an offline client connects to an online state, changes are synchronized (synced). All the pages created offline from the same proto link will have the same object ID and the content of the pages are then synced correctly under the same page ID and name.

20 Claims, 11 Drawing Sheets

(56) References Cited

U.S. PATENT DOCUMENTS

| | | | | |
|---|---|---|---|---|
| 6,067,551 | A * | 5/2000 | Brown | G06Q 10/10 |
| 6,343,313 | B1 * | 1/2002 | Salesky | G06F 3/1415 |
| | | | | 709/203 |
| 7,143,419 | B2 | 11/2006 | Fischer et al. | |
| 7,383,320 | B1 | 6/2008 | Silberstein et al. | |
| 7,424,671 | B2 * | 9/2008 | Elza | G06F 17/2241 |
| | | | | 715/234 |
| 8,429,753 | B2 * | 4/2013 | Skaria | G06F 21/6218 |
| | | | | 709/225 |
| 2002/0029245 | A1 | 3/2002 | Nahon et al. | |
| 2002/0065912 | A1 | 5/2002 | Catchpole et al. | |
| 2002/0083145 | A1 | 6/2002 | Perinpanathan | |
| 2005/0039116 | A1 | 2/2005 | Slack-Smith | |
| 2005/0234943 | A1 | 10/2005 | Clarke | |
| 2006/0053380 | A1 * | 3/2006 | Spataro | G06F 17/30011 |
| | | | | 715/753 |
| 2006/0101514 | A1 | 5/2006 | Milener et al. | |
| 2006/0161516 | A1 | 7/2006 | Clarke et al. | |
| 2006/0206583 | A1 | 9/2006 | Hill | |
| 2007/0016650 | A1 | 1/2007 | Gilbert et al. | |
| 2007/0174387 | A1 | 7/2007 | Jania et al. | |
| 2007/0208751 | A1 | 9/2007 | Cowan et al. | |
| 2007/0244906 | A1 | 10/2007 | Colton et al. | |

OTHER PUBLICATIONS

"Building online/offline synchronization capabilities with the Microsoft Sync Framework", Nov. 14, 2007, MSDN Blogs.
Huang et al., "Pocket RikWik: A Mobile Wiki Supporting Online and Offline Collaboration", Wei-Che Huang, 2006.
"Groove", 2007.

\* cited by examiner

- 500
- INSERT LINK
- ☐ PLACE IN NOTEBOOK
- ☐ EXISTING FILE OR WEB PAGE

TEXT TO DISPLAY: CU

PICK AN EXISTING TARGET PAGE/SECTION/SECTION GROUP OR CREATE NEW TARGET PAGE

CU

CUST RCNT LOC

| CURRENT PG: "BETA 1 TR CUST RE... | (V3 PLNG/CUST REQ) |

TITLE: CU (35)

| CUST REQ | (V3 PLNG) |
| MISC CUST FEEDBACK | (PLNG NTBK) |
| CUSTOMERS | (PM TEAM NTBK/ARCHIVE) |
| CUST FEEDBACK MTG SCH | (PM NTBK/HOME) |
| CUST REQ | (MY AREAS/TAGS) |
| CONNECT CUST SUG | (PLNG NTBK/MISC CUST) |
| ADDS CUST NOTES | (UNFILED NOTES) |
| CUT THIS FEAT | (PLNG NTBK/AREA SPE...) |
| PSS NOTES - MIC MA - CUST | (PM NTBK/HOME) |

ADDRESS: ▼

[ OK ] [ CANCEL ]

```
                                    ┌─ 600
CUSTOMER
TITLE: CUSTOMER (4) ─────────────────────────────────────────

CUSTOMER REQUESTS              (V3 PLANNING)
CUSTOMER MEETINGS              (PM TEAM NOTEBOOK/ARCHIVE)
CUSTOMER FEEDBACK MTG SCHEDULE (ON14 PM NOTEBOOK/HOME)
CUSTOMER REQUESTS              (MY AREAS/TAGS)
```

ONLINE/OFFLINE PROTO LINK BEHAVIOR AND PROTO PAGE CONFLICT RESOLUTION

CROSS-REFERENCE TO RELATED APPLICATIONS

This application is a continuation of co-pending Non-Provisional patent application Ser. No. 12/140,252, entitled "Online/Offline Proto Link Behavior and Proto Page Conflict Resolution," filed Jun. 16, 2008, now U.S. Pat. No. 8,612,520, issued Dec. 17, 2013.

BACKGROUND

A wiki is a collaboration tool that is gaining popularity for the online sharing and editing of a wide variety of topics. Wikis have the concept of proto links where the author of a wiki page, while authoring content, creates the proto link (or placeholder) to a non-existent page, which proto link can be denoted by a special dotted underline. The proto link serves as a reminder that a page on a particular topic is empty and invites collaboration from other users of the wiki who may be able to contribute to this topic. When a user selects the proto link, a page is automatically created that is the target page for the proto link. The user is navigated to the target page where content can be authored.

Although this feature behavior may be common, it is noted that most wikis are designed to be online and do not have off-lining capabilities. This means that a proto link target resolution will always result in a single page being created. The ability to provide the same wiki proto link behavior both online and offline, however, is problematic. This can result in multiple offline clients resolving the same proto link offline, thus, creating multiple proto page targets for the same link. When the offline clients come back online and synchronization occurs, a page conflict will result where there are multiple proto pages for the same link resulting in incorrect and incomplete content and also conflict in resolving the target page for the link.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates offline/online interaction with online collaboration documents or pages such as for wikis and/or notebooks. More specifically, for every proto link employed in a page, a unique object ID is provided. The client, whether online or offline, uses the object ID as the page's object ID when a target page is created at the time of resolving the associated proto link (e.g., when a user clicks on a proto link to navigate to the proto page). When an offline client connects to an online state, changes are synchronized (synced). All the pages created offline from the same proto link will have the same object ID and the content of the pages are then synced correctly under the same page ID and name.

To the accomplishment of the foregoing and related ends, certain illustrative aspects are described herein in connection with the following description and the annexed drawings. These aspects are indicative of the various ways in which the principles disclosed herein can be practiced, all aspects and equivalents of which are intended to be within the scope of the claimed subject matter. Other advantages and novel features will become apparent from the following detailed description when considered in conjunction with the drawings.

DETAILED DESCRIPTION

Existing online collaboration environments such as wikis and notebooks are purely online-only tools and do not have the notion of resolving proto links offline, which makes mobile scenarios very limiting. A proto link is a link (in a shared document such as in a notebook) that has no existing target page and allows a user to link to non-existent content. In order to follow the link, the target page is automatically created when the link is resolved.

The disclosed architecture provides the capability to automatically synchronize (sync) and merge conflicts between documents edited offline with the associated online document version. Since wikis and notebooks are primarily intended to be a multi-user authoring and collaboration tools, the automated sync and merge features allow for seamless collaboration that transcends the boundaries of connected vs. unconnected and single vs. multiple authors.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

Figure 1:
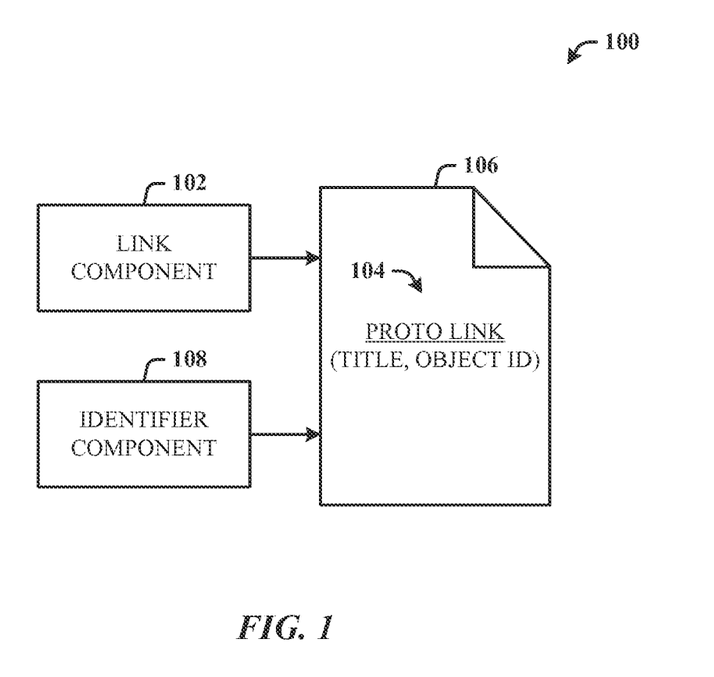
FIG. 1 illustrates an exemplary management system for a collaboration environment.

FIG. 1 illustrates an exemplary management system 100 for a collaboration environment. The system 100 includes a link component 102 for creating a proto link 104 with a title in a collaboration document 106, and an identifier component 108 for generating and including an object identifier (ID) as part of the proto link 104. When the proto link 104 is created, the link maps to a non-existent target page. This has an effect of not cluttering up the system with target pages that may or may not ever be used. The target page is only created when the user resolves (selects the proto link 104 to navigate to the target page). Moreover, when the user views existing target pages resolved due to user selection of the proto links of different pages, the user will not needlessly see empty target pages that have yet to receive user content, but will only see target pages that the users have actually caused to be created and will have user content.

The object identifier is employed for identifying a target page (not shown) associated with the proto link 104. The proto link 104 can further include a section identifier associated with a section in the collaboration document 106 in which the proto link 104 is located.

The target page is only created in response to resolving of the proto link 104 during an online process. In one embodiment, the target page is created online, a copy of the online target page is taken offline, changes to the offline target page create a modified target page, and the modified target page is then synchronized to and merged with the target page during an online process based on the object identifier.

In another embodiment, the target page is created offline, changes to the offline target page create a modified target page, and the modified target page is then synchronized to and merged with the target page during an online process based on the object identifier.

Figure 2:
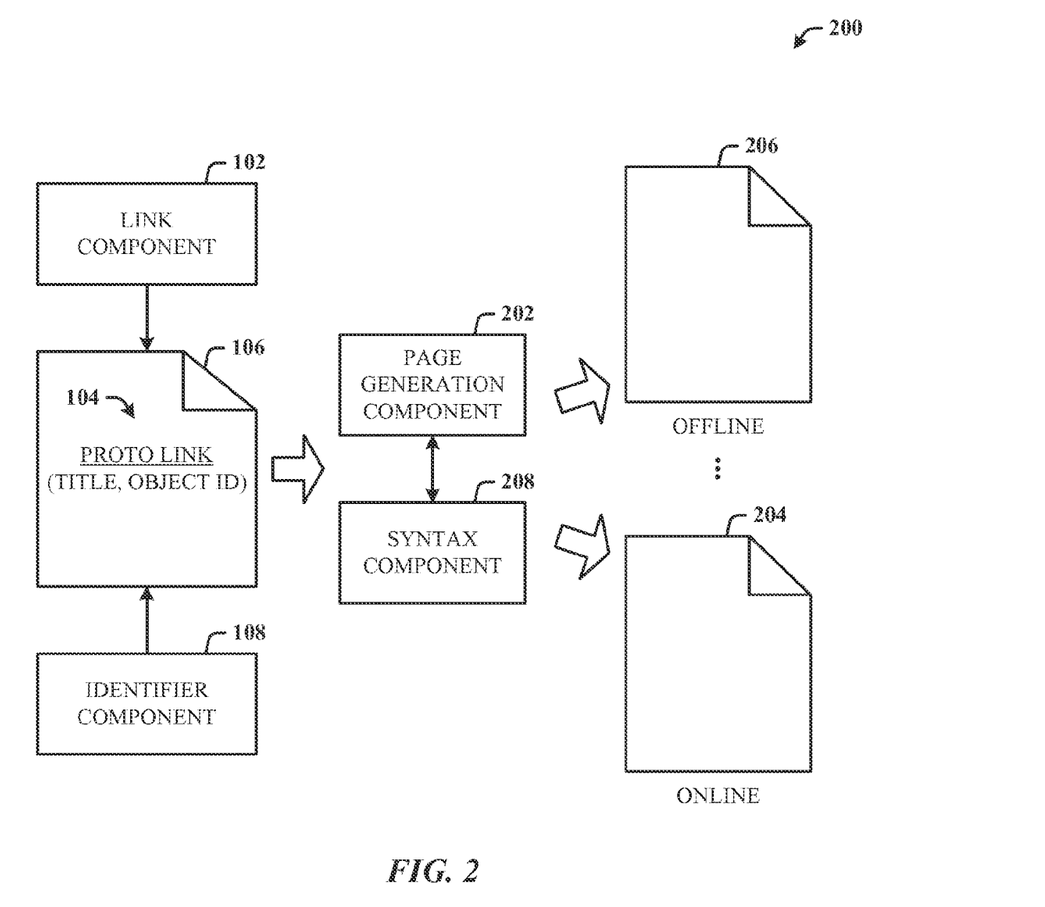
FIG. 2 illustrates a more detailed implementation of an exemplary document management system.

FIG. 2 illustrates a more detailed implementation of an exemplary document management system 200. The system 200 include the link component 102 for creating the proto link 104 with the title in a collaboration document 106, an identifier component for generating and including an object identifier and a section identifier as part of the proto link 104, the object identifier for identifying a target page associated with the proto link. The system 200 also includes a page generation component 202 for creating an online target page 204 in response to resolving the proto link 104. The object identifier is assigned to the online target page 204. The user can then take the online page 204 to an offline situation, and then make changes to the page 204. The changes to the offline page can then be synchronized to the online page when the user comes back online. This is based on the object identifier in the proto link.

Alternatively, the user copies the collaboration document 106, moves to an offline mode, and resolves the proto link 104 in response to which an offline target page 206 is created. The user then adds content, edits or modifies existing content on the offline page 206, goes online, and the changes are then synchronized to the online page 204, all based on the object identifier.

The system 200 further comprises a syntax component 208 for detecting syntax of the proto link as the user is entering the proto link 104 into the document 106. The syntax component 208 can search for an existing document element based on the syntax. For example, where electronic notebooks are used, the search can be performed on the current notebook page, and then to other pages of the notebook, followed by pages of other notebooks. Alternatively, the syntax component 208 creates a proto link to a non-existent target page if an existing document element is not found.

Figure 3:
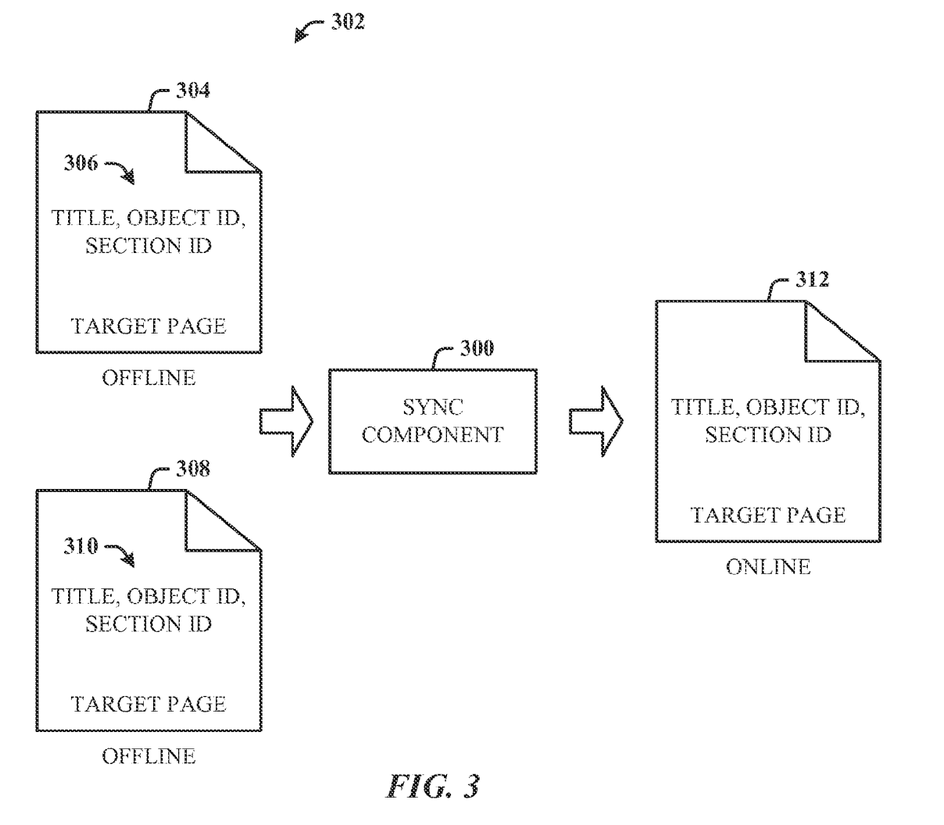
FIG. 3 illustrates a synchronization component that can be employed for online synchronization of the changes made to offline pages.

FIG. 3 illustrates a synchronization component 300 that can be employed for online synchronization of the changes made to offline pages 302. The synchronization component 300 synchronizes and merges a modified target page to the target page. The synchronization component 300 also provides conflict resolution during this synchronization process. Here, a first offline page 304 includes a first proto link 306 (having a title, object ID, and section ID), and a second offline document 308 includes a second proto link 310 (having a title, object ID, and section ID). When brought online, changes to the offline pages 302 are synchronized and merged with the online target page 312 based on the object identifier. Moreover, the sections in the offline pages 302 which the respective proto links (306 and 310) reside can be considered to more accurately synchronize to and merge with the corresponding section in the online target page 312.

Figure 4:
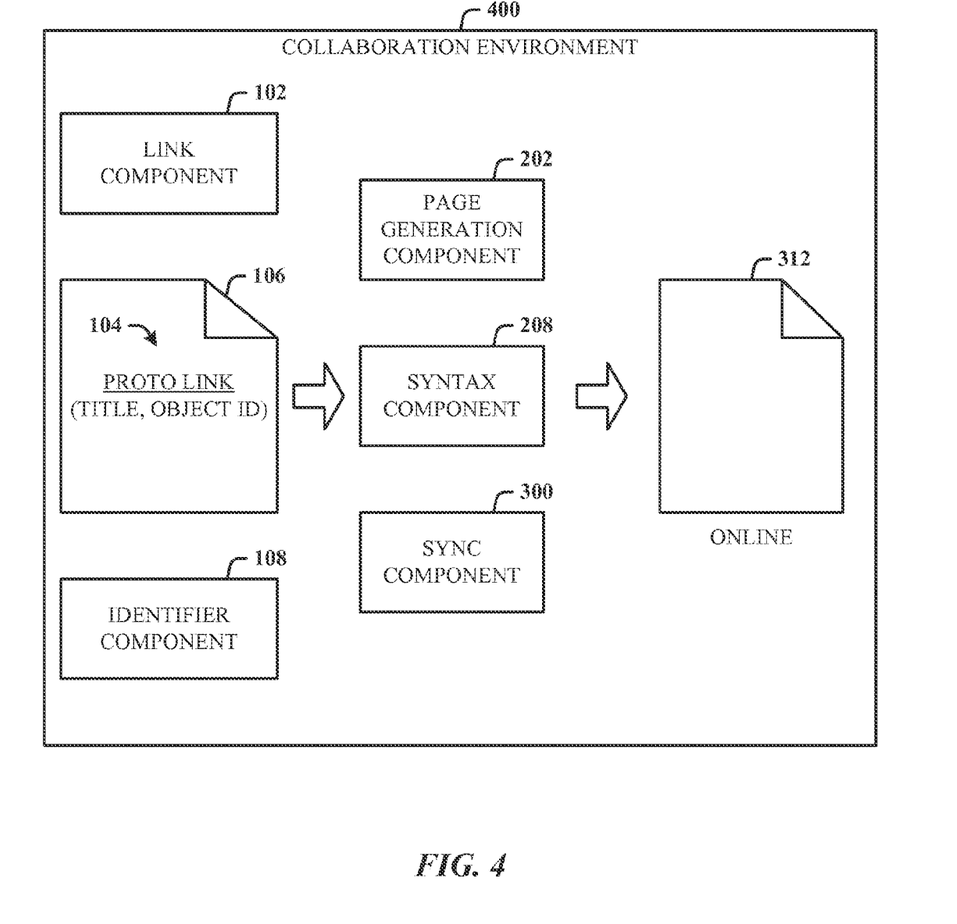
FIG. 4 illustrates a collaborative environment in which proto link generation using object identifiers can be performed.

FIG. 4 illustrates a collaborative environment 400 in which proto link generation using object identifiers can be performed. This is particularly useful in collaborative environments such as network-based wikis and electronic notebooks where document sharing can occur. The environment 400 includes the link component for creating the proto link 104 with a title in the collaboration document 106, and an identifier component 108 for generating and including an object identifier and section identifier as part of the proto link 104, at least the object identifier is used for identifying the online target page 312 associated with the proto link 104. The environment 400 further includes the page generation component 202 for creating the target page 312 in response to resolving the proto link 104, where the object identifier is assigned to the target page 312. The synchronization component 300 synchronizes and merges a modified target page to the target page 312.

The syntax component 208 detects syntax of the proto link 104 and searches for an existing document element (of a notebook) based on the syntax, or creates the proto link 104 to a non-existent target page if an existing document element is not found.

As before, the target page 312 can be created online in response to the resolving of the proto link during an online process. The target page 312 can be taken offline, changes made to create the modified target page, and the modified target page synchronized to and merged with the online 312 target page during an online process. Alternatively, the target page 312 is created offline in response to the resolving of the proto link 104 during an offline process, changes to the modified target page are made offline, and the modified target page is synchronized to and merged with the online target page 312 during an online process.

Figure 5:
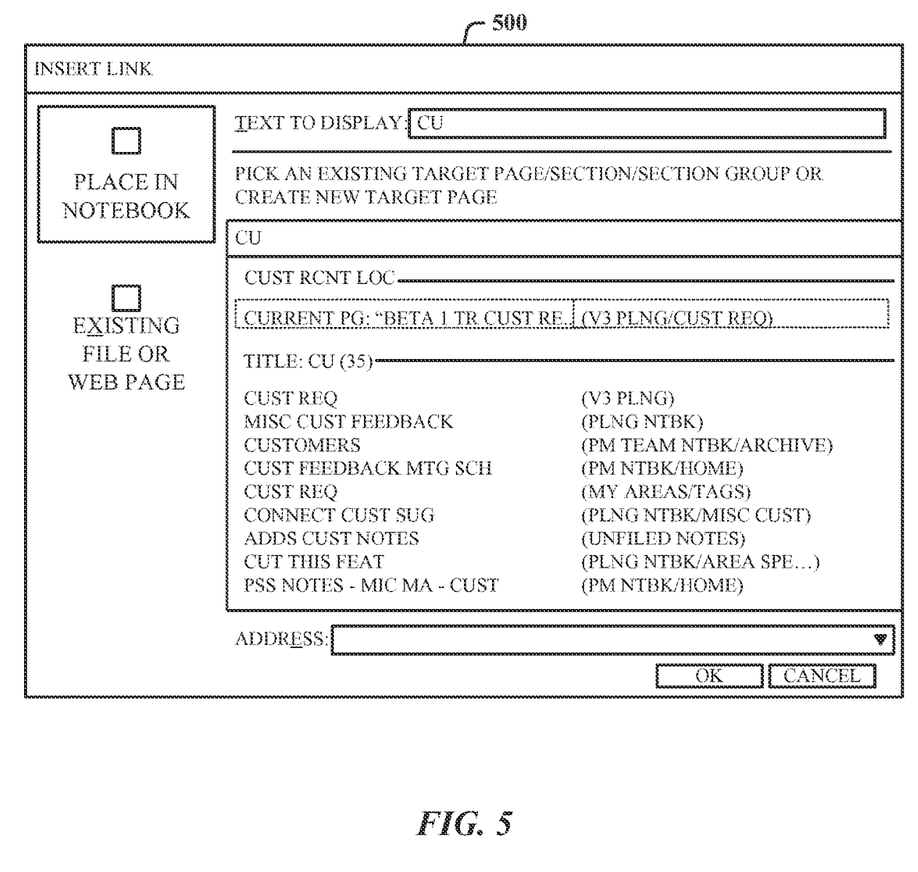
FIG. 5 illustrates a screenshot of a dialog panel that can be employed as part of a user interface for exposing entry points to creating proto links.
Figure 6:
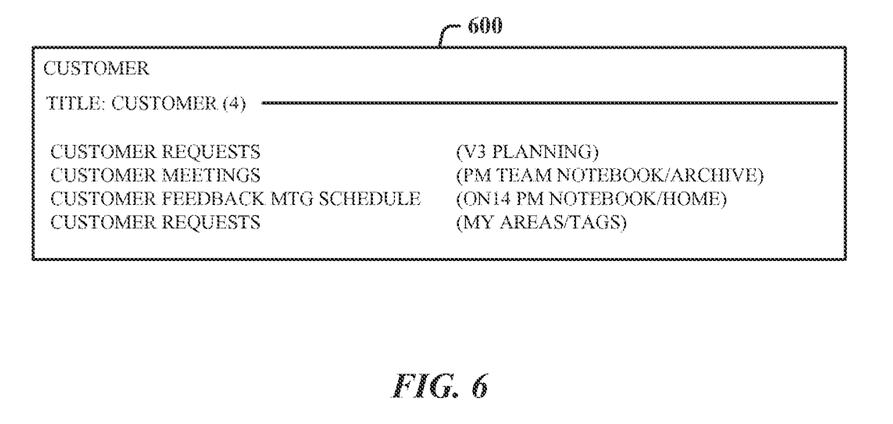
FIG. 6 illustrates a screenshot of a popup as an entry point for finding matching elements.

FIGS. 5 and 6 are screenshots of an example user interface that can be utilized FIG. 5 illustrates a screenshot of a dialog panel 500 that can be employed as part of a user interface for exposing entry points to creating proto links. The dialog panel 500 provides an entry point to link to web pages as well as other notes. The panel shows a view with "Place in Notebook" selected. A current notebook page is highlighted (the dotted line blocks). The user can search by typing in the "Search by Text in title" text box. This shows the narrowed down list of matching titles in the control that the user can choose from. New page can be created (within the current section) using a new page option within the control.

This displays all the notebook elements with matching title. If the user selects a particular notebook element and hits OK, a link is created to this element. The "Text to Display" text box can also display the user highlighted text. The text on the page does not change unless the user changes the text to display value. An example where the user selects text "cu". Results include entities having the "cu" string.

FIG. 6 illustrates a screenshot of a popup 600 as an entry point for finding matching elements. For example, if there is text selected when entering a predefined keystroke combination, the selected text is used for matching titles. For example, if the user highlights the string "customer" on the page and enters the predefined keystroke combination, the behavior of the popup 600 is shown to include entries where the string "customer" is included within the double brackets ([[Customer]]). A list of all matches that contain the string "Customer" is displayed in the popup 600. The IP is on the first match (sorted by current notebook first). In the example, the IP can be on Customer (V3 Planning).

Note that for all matches, the hierarchy (including page hierarchy) is shown in detail beside the matched element (e.g., Page Name (Notebook\Section Group\Section)). This aids the user in determining the correct match when there are name collisions. The user can choose to ignore existing matches and create a new page with the same title. Since every wiki link is stored with a unique GUID (globally unique ID), the target linking correctly resolves the page the user linked to even if there is more than one page with the same name. The New page option can be displayed with the user-typed string name. If the user hits esc or clicks away, then the element matching UI is exited and the string is left unchanged with the surrounding brackets.

Following is a series of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 7:
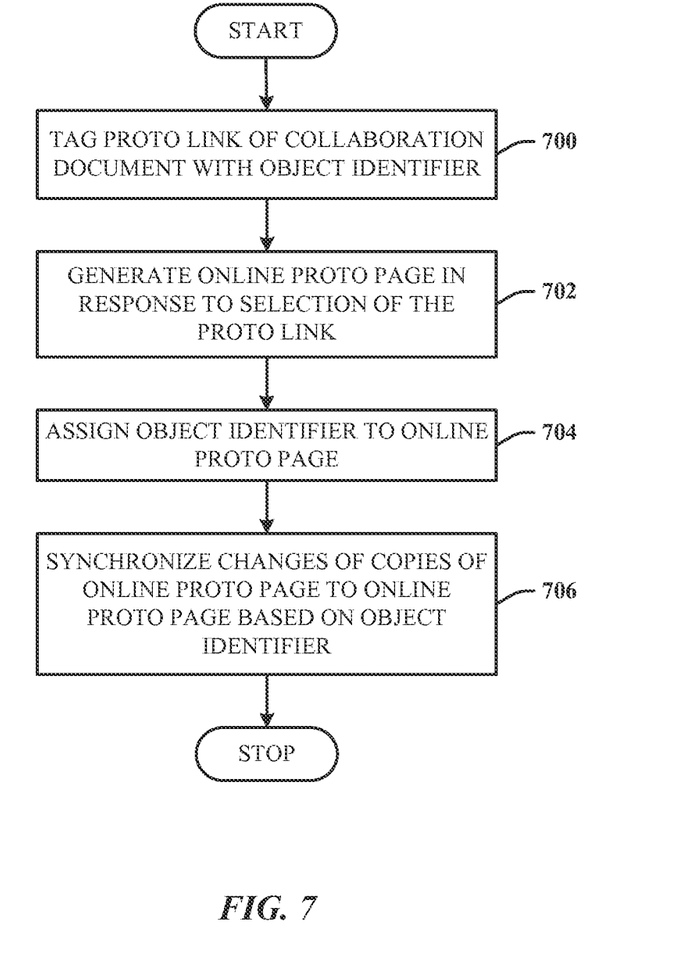
FIG. 7 illustrates a method of managing documents.

FIG. 7 illustrates a method of managing documents. At 700, a proto link of a collaboration document is tagged with an object identifier. At 702, an online proto page is automatically in response to selection of the proto link. At 704, the object identifier is assigned to the online proto page. At 706, changes of copies of the online proto page are synchronized to the online proto page based on the object identifier.

The method can further comprise merging proto page information of another offline proto page to the online proto page as part of the synchronizing. The method can further comprise assigning the identifier to all copies of the proto page taken offline and synchronizing the copies to the online proto page based on the identifier. The method can further comprise assigning the object identifier in combination with a title of the proto link and also assigning a section identifier as part of the proto link. The method can further comprise creating the proto link using syntax that triggers a syntax algorithm to tag the proto link with the object identifier, and denoting the proto link as a placeholder link with a non-existent target page. The proto page can be associated with a wiki network site and/or a server-based notebook.

The scenarios for creating proto links include using syntax that triggers proto link insertion. For example, syntax such as "[[ ]]" that is entered when the user is typing content on a page and user starts to type "[[" to denote the beginning of a link indicated the start of link entry. The syntax algorithm looks for string between "[[" and "]]" in the same element (e.g., notebook). Then a match to find an existing element is initiated. If a match is found, then a link is created to the existing element. If the match is not found, a proto link to a non-existent page is created. The details are described below: Following is one example of a syntax algorithm. If user enters "]" and the symbol is preceded by another "]" with no space, then, if there is a preceding "[[" within the same element, then get string between "[[" and "]]". Note that this is just one example of syntax and techniques for identifying wiki links. Other syntax and techniques can be employed.

Then check if there is an exact string match in the titles of the elements. The scope of the search can be the current notebook first, followed by all user opened notebooks, followed by unfiled notes. The search can look for exact string matches on the title of all pages (including placeholder/proto pages), sections and section groups, within the search scope described above. If there is a unique match, then the proto link is created to the existing page. If there is not a notebook element with the title match, then a proto link is created to the target page. Proto links will contain an object ID stored with them.

When a user clicks on a proto link, a page is automatically created using the same proto link object ID. The link can also contain the section ID from where the link is created, in addition to the object ID. The new target page is created with the same object ID in the section denoted by the Section ID.

When multiple clients are working on a notebook offline and when a proto link is selected, new proto pages are created using the object ID and section ID denoted in the link. When moving back online, even if there are multiple proto pages existing for the same link, the pages will all have the same object ID. The application will detect this as part of the synchronization logic and performs a union merge that consolidates content from all clients that authored this proto page into a single page (using the same object ID) which is the target page for the proto link. This ensures that all proto links are resolved correctly and content in proto pages are complete and correct across online/offline scenarios.

Note that the proto link, when created, can be shown by a dotted line to denote that this is only a placeholder link (a dotted link) and a corresponding target page does not yet exist. Ex: Customer. In other words, a dotted link is a link in a notebook or wiki that is rendered with a dotted underline as a visual cue to the viewer that this is either a proto link or it links to a placeholder page.

A placeholder is a page with no content other than a title. Only when a user clicks on this proto link is the new page created as described above. This new page becomes the target page for the proto link. If there is more than one match, then the element matching UI is presented with all the matches. The user can select one or create a new page. The popup 600 of FIG. 6 shows matching to a user entered [[Customer]] on the page.

Figure 8:
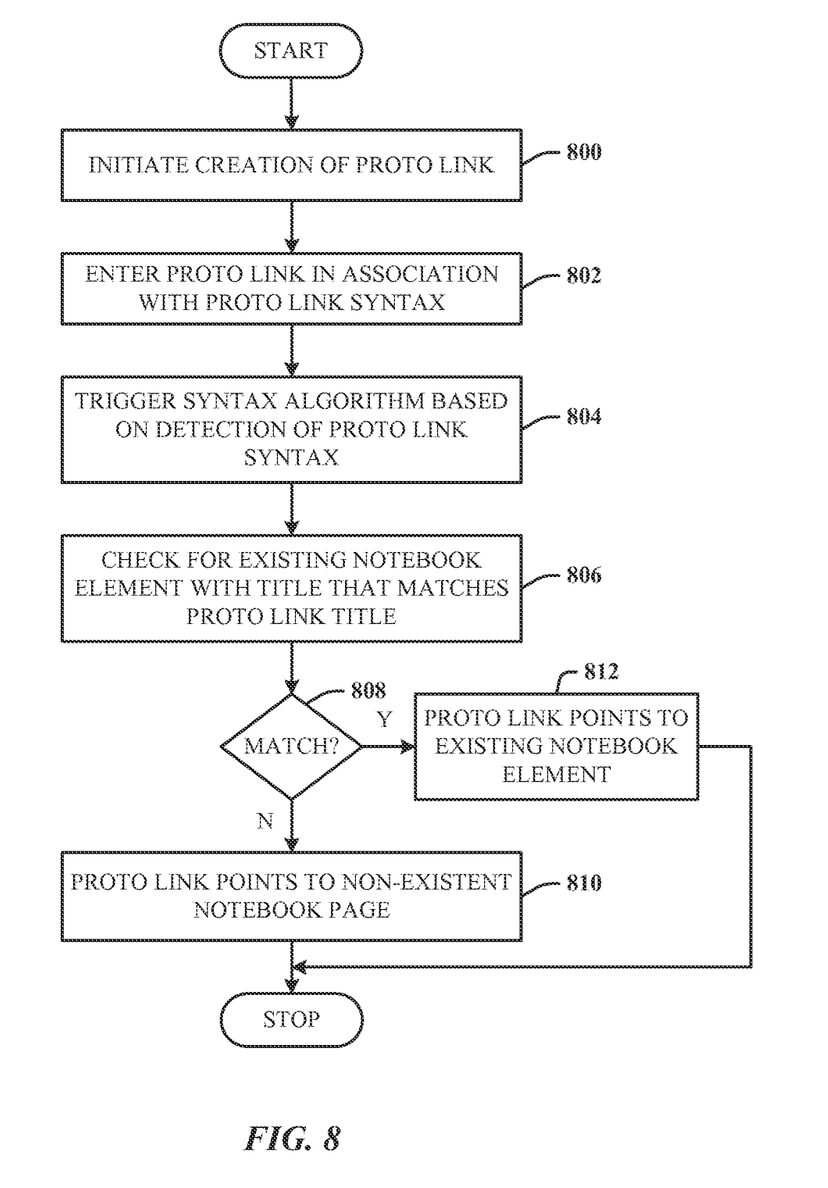
FIG. 8 illustrates a method of creating a proto link.

FIG. 8 illustrates a method of creating a proto link. At 800, the method is initiated. At 802, a proto link is entered in association with proto link syntax. At 804, the syntax triggers the syntax algorithm. At 806, a check is performed for an existing notebook element with a title that matches the proto link title. At 808, if a match is not found, flow is to 810 where the proto link points to a non-existent notebook page. Alternatively, if a match is found, flow is from 808 to 812 where the proto link points to the existing notebook element.

Figure 9:
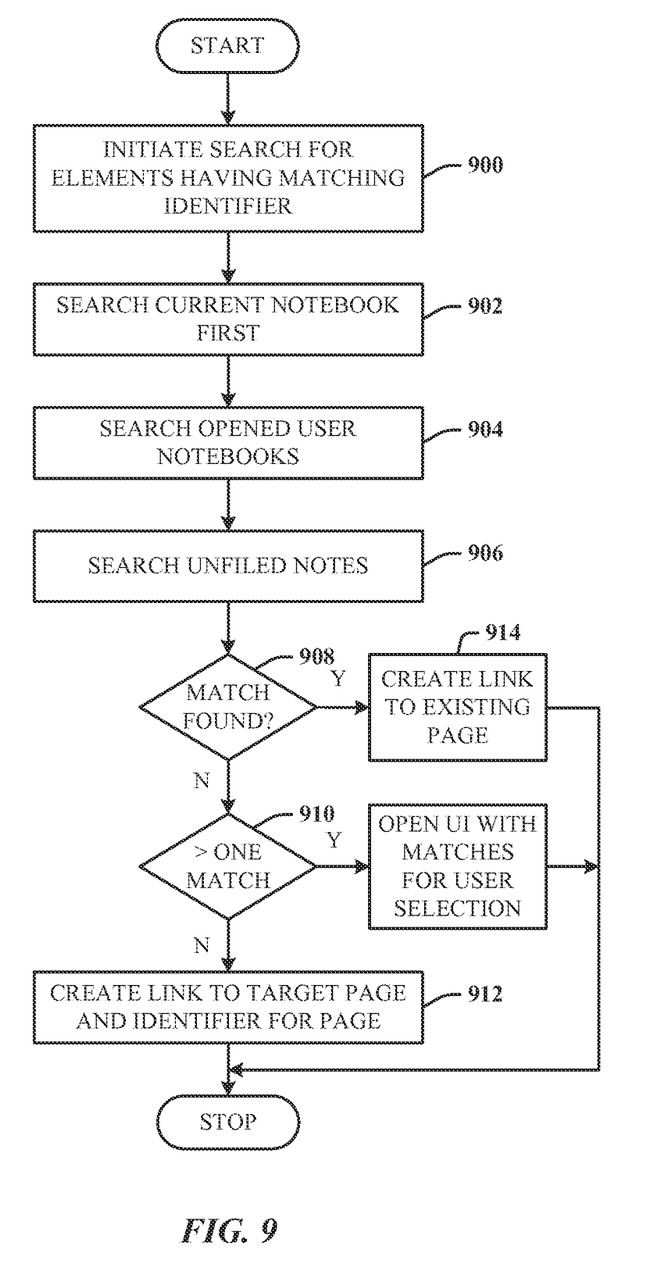
FIG. 9 illustrates a method of searching for elements having matching identifiers.

FIG. 9 illustrates a method of searching for elements having matching identifiers. At 900, the search for matching identifiers is initiated. At 902, the current notebook is searched first. At 904, opened notebooks are searched. At 906, unfiled notes are searched. At 908, if a match is not found, flow is to 910 to determine if more than one match is found. If not, flow is from 910 to 912 to create a proto link to a target page and the object identifier for that page. If, however, a match is found at 9089, flow is to 914 to create the proto link to an existing page. If, at 910, a match of more than one match is found, flow is to 916 to open a UI showing the matches and let the user select the match.

As previously indicated, proto links can be shown as dotted links in the notebook/section (in both cases where the user has read-only or read-write permissions). If the proto links are followed and a placeholder page is created, as long as this page remains a placeholder, the link remains dotted. This placeholder page can be shown as a dotted page tab. A dotted page tab is a page rendered with a dotted underline as a visual cue to the viewer that this is a placeholder page. Once this page has content added, the corresponding link becomes an underlined hyperlink. The dotted underline in the page tab can also be removed once the page has content added to it.

Hyperlinks to placeholder pages can be shown as dotted links to alert the user that the page does not yet have content. Corresponding placeholder pages are denoted as a dotted page tab. Note that the rendering of links or target pages may not occur synchronously with user edits. Thus, there may be a time lag in rendering the current state of some of the links and pages accurately.

If the user follows a proto link, a new target page for this link is created and the placeholder page appears in the page tab. If the user navigates away from the page and reverts the target page creation, the user can choose a keystroke input (e.g., CTRL-Z) after following the link to the target page. This deletes the page, removes the page from page tab, and keeps the proto link as a dotted link.

A check is made to determine if there is an existing page with the exact same title match. Only if the page is not available, is a new placeholder page created. This can be a right click menu option and is enabled when there is text selected. Otherwise, this option can remain disabled in the menu.

As used in this application, the terms "component" and "system" are intended to refer to a computer-related entity, either hardware, a combination of hardware and software, software, or software in execution. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Aspects of the technology include a computer-implemented document management system executed by a processor. The system includes a collaboration environment configured to include at least one of a network-based wiki or an electronic notebook for multi-user authoring and document sharing of a collaboration document. The system also includes a link component configured to create a placeholder link with a title in the collaboration document, the placeholder link maps to a non-existent placeholder page, the placeholder link is a visual cue indicating the placeholder page. The system additionally includes an identifier component configured to generate and include an object identifier as part of the placeholder link, the object identifier identifies the placeholder page associated with the placeholder link. The system further includes a page generation component configured to create the placeholder page in response to clicking the placeholder link to navigate to the placeholder page, using the object identifier assigned to the placeholder page. The system further includes a target page converted from the placeholder page upon receiving user content, wherein the placeholder link is replaced by an underlined hyperlink. The system additionally includes a synchronization component configured to synchronize and merge a modified target page to the target page based on the object identifier. The system also includes a microprocessor circuit configured to execute computer-executable instructions in a memory associated with at least one of the collaboration environment, the link component, or the identifier component.

Figure 10:
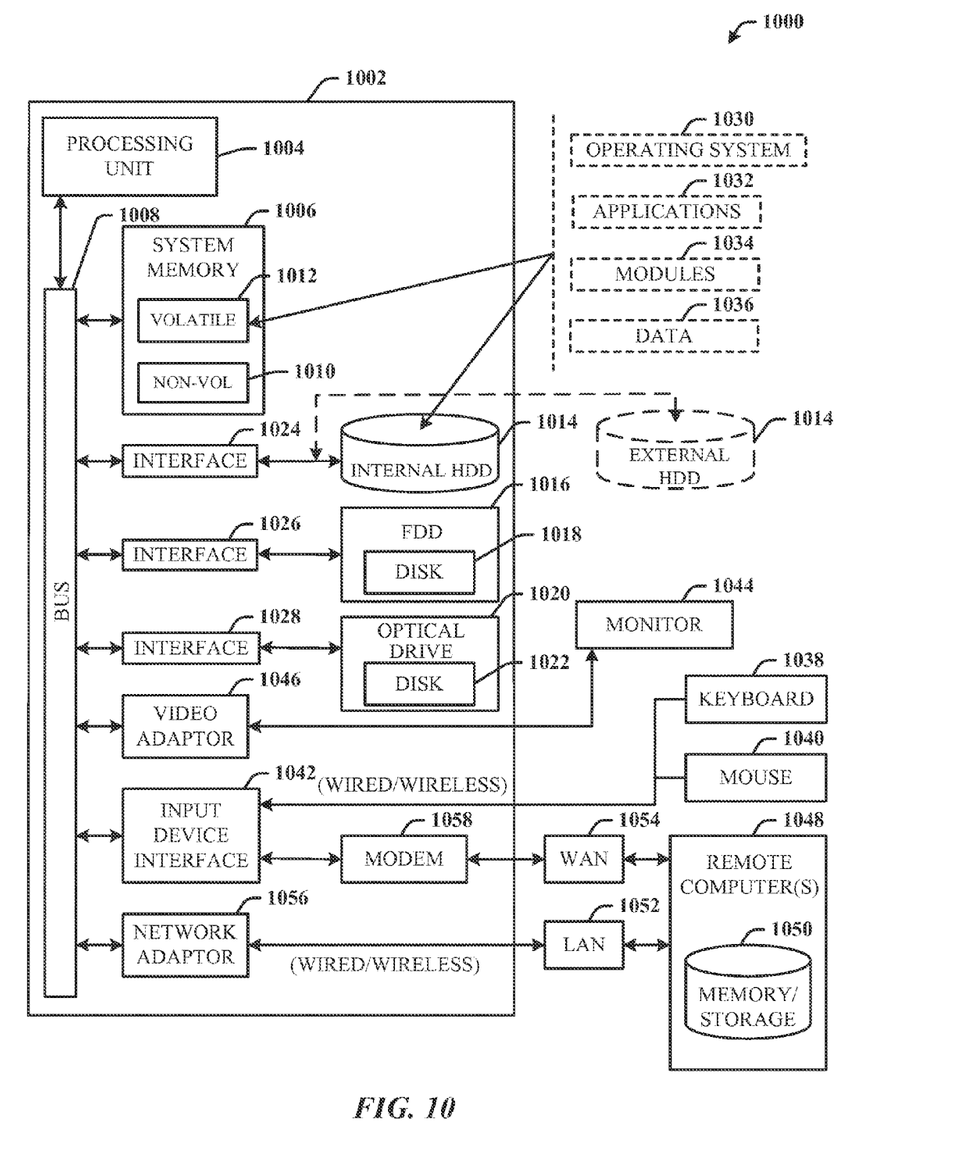
FIG. 10 illustrates a block diagram of a computing system operable to execute for proto link creation and processing in accordance with the disclosed architecture.

Referring now to FIG. 10, there is illustrated a block diagram of a computing system 1000 operable to execute for proto link creation and processing in accordance with the disclosed architecture. In order to provide additional context for various aspects thereof, FIG. 10 and the following discussion are intended to provide a brief, general description of a suitable computing system 1000 in which the various aspects can be implemented. While the description above is in the general context of computer-executable instructions that may run on one or more computers, those skilled in the art will recognize that a novel embodiment also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects can also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes volatile and non-volatile media, removable and non-removable media. By way of example, and not limitation, computer-readable media can comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

With reference again to FIG. 10, the exemplary computing system 1000 for implementing various aspects includes a computer 1002 having a processing unit 1004, a system memory 1006 and a system bus 1008. The system bus 1008 provides an interface for system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 can include non-volatile memory (NON-VOL) 1010 and/or volatile memory 1012 (e.g., random access memory (RAM)). A basic input/output system (BIOS) can be stored in the non-volatile memory 1010 (e.g., ROM, EPROM, EEPROM, etc.), which BIOS are the basic routines that help to transfer information between elements within the computer 1002, such as during start-up. The volatile memory 1012 can also include a high-speed RAM such as static RAM for caching data.

The computer 1002 further includes an internal hard disk drive (HDD) 1014 (e.g., EIDE, SATA), which internal HDD 1014 may also be configured for external use in a suitable chassis, a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as a DVD). The HDD 1014, FDD 1016 and optical disk drive 1020 can be connected to the system bus 1008 by a HDD interface 1024, an FDD interface 1026 and an optical drive interface 1028, respectively. The HDD interface 1024 for external drive implementations can include at least one or both of Universal Serial Bus (USB) and IEEE 1394 interface technologies.

The drives and associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette (e.g., FDD), and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing novel methods of the disclosed architecture.

A number of program modules can be stored in the drives and volatile memory 1012, including an operating system 1030, one or more application programs 1032, other program modules 1034, and program data 1036. Where the computer 1002 supports a collaboration server environment, the one or more application programs 1032, other program modules 1034, and program data 1036 can include the link component 102, identifier component 108, page (or document) 106, proto link 104, page generation component 202, syntax component 208, target pages (online page 204 and offline page 206), the offline pages 302 and associated links (306 and 310), the sync component 300, target page 312, the collaboration environment 400 (e.g., wiki, notebook, etc.), dialog panel 500, popup 600 and methods of FIGS. 7, 8 and 9, for example.

All or portions of the operating system, applications, modules, and/or data can also be cached in the volatile memory 1012. It is to be appreciated that the disclosed architecture can be implemented with various commercially available operating systems or combinations of operating systems.

A user can enter commands and information into the computer 1002 through one or more wire/wireless input devices, for example, a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces such as a parallel port, IEEE 1394 serial port, a game port, a USB port, an IR interface, etc.

A monitor 1044 or other type of display device is also connected to the system bus 1008 via an interface, such as a video adaptor 1046. In addition to the monitor 1044, a computer typically includes other peripheral output devices (not shown), such as speakers, printers, etc.

The computer 1002 may operate in a networked environment using logical connections via wire and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wire/wireless connectivity to a local area network (LAN) 1052 and/or larger networks, for example, a wide area network (WAN) 1054. Such LAN and WAN networking environments are commonplace in offices and companies, and facilitate enterprise-wide computer networks, such as intranets, all of which may connect to a global communications network, for example, the Internet.

When used in a LAN networking environment, the computer 1002 is connected to the LAN 1052 through a wire and/or wireless communication network interface or adaptor 1056. The adaptor 1056 can facilitate wire and/or wireless communications to the LAN 1052, which may also include a wireless access point disposed thereon for communicating with the wireless functionality of the adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wire and/or wireless device, is connected to the system bus 1008 via the input device interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with wire and wireless devices or entities using the IEEE 802 family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity), WiMax, and Bluetooth™ wireless technologies. Thus, the communication can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 11:
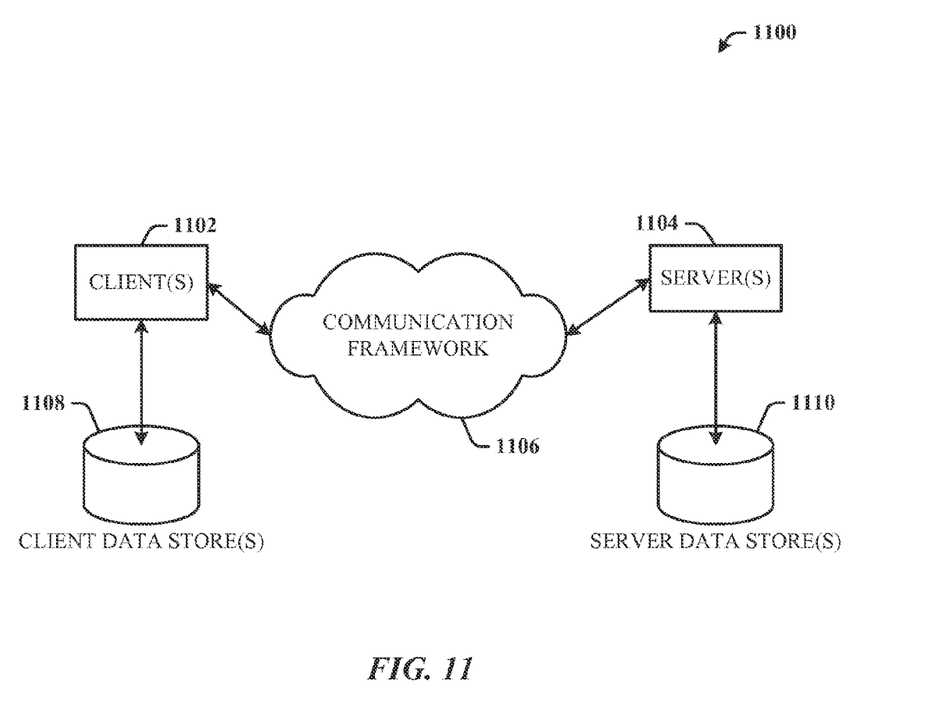
FIG. 11 illustrates a schematic block diagram of an exemplary computing environment for proto link creation and document processing using proto links.

Referring now to FIG. 11, there is illustrated a schematic block diagram of an exemplary computing environment 1100 for proto link creation and document processing using proto links. The environment 1100 includes one or more client(s) 1102. The client(s) 1102 can be hardware and/or software (e.g., threads, processes, computing devices). The client(s) 1102 can house cookie(s) and/or associated contextual information, for example.

The environment 1100 also includes one or more server(s) 1104. The server(s) 1104 can also be hardware and/or software (e.g., threads, processes, computing devices). The servers 1104 can house threads to perform transformations by employing the architecture, for example. One possible communication between a client 1102 and a server 1104 can be in the form of a data packet adapted to be transmitted between two or more computer processes. The data packet may include a cookie and/or associated contextual information, for example. The environment 1100 includes a communication framework 1106 (e.g., a global communication network such as the Internet) that can be employed to facilitate communications between the client(s) 1102 and the server(s) 1104.

Communications can be facilitated via a wire (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented document management system executed by a processor, comprising:

a collaboration environment, configured to include at least one of a network-based wiki or an electronic notebook, for multi-user authoring and document sharing of a collaboration document;

a link component configured to create a placeholder link with a title in the collaboration document, the placeholder link maps to a non-existent placeholder page, the placeholder link is a visual cue indicating the placeholder page;

an identifier component configured to generate and include an object identifier as part of the placeholder link, the object identifier identifies the placeholder page associated with the placeholder link;

a page generation component configured to create the placeholder page in response to clicking the placeholder link to navigate to the placeholder page, using the object identifier assigned to the placeholder page;

a target page converted from the placeholder page upon receiving user content, wherein the placeholder link is replaced by an underlined hyperlink;

a synchronization component configured to synchronize and merge a modified target page to the target page based on the object identifier; and a microprocessor circuit configured to execute computer-executable instructions in a memory associated with at least one of the collaboration environment, the link component, or the identifier component.

2. The system of claim 1, wherein the target page is created online in response to the clicking of the placeholder link during an online process, changes to the modified target page are made offline, and the modified target page is synchronized to and merged with the target page during an online process based on the object identifier.

3. The system of claim 1, wherein the target page is created offline in response to the clicking of the placeholder link during an offline process, changes to the modified target page are made offline, and the modified target page is synchronized to and merged with the target page during an online process based on the object identifier.

4. The system of claim 1, wherein the placeholder link includes a section identifier associated with a section in the collaboration document in which the placeholder link is located.

5. The system of claim 1, further comprising a syntax component configured to detect syntax of the placeholder link and search for an existing document element based on the syntax.

6. The system of claim 5, wherein the syntax component creates a placeholder link to a non-existent target page if an existing document element is not found.

7. A computer-implemented method of managing documents, comprising acts of:

using a collaboration environment, including at least one of a network-based wiki or an electronic notebook, for creating a placeholder link in a collaboration document, the placeholder link maps to a non-existent online placeholder page and is a visual cue indicating the online placeholder page;

tagging the placeholder link of the collaboration document with an object identifier; generating the online placeholder page in response to selection of the placeholder link to navigate to the online placeholder page; assigning the object identifier to the online placeholder page;

converting the online placeholder page to an online target page upon receiving user content, and replacing the placeholder link with an underlined hyperlink;

synchronizing and merging changes of modified target pages, made from copies of the online target page, to the online target page based on the object identifier; and utilizing a microprocessor circuit that executes instructions stored in memory to perform at least one of the acts of creating, tagging, generating, assigning, converting, or synchronizing.

8. The method of claim 7, further comprising merging page information of another offline target page to the online target page as part of the synchronizing.

9. The method of claim 7, further comprising assigning the object identifier to all copies of the target page taken offline and synchronizing the copies to the online target page based on the identifier.

10. The method of claim 7, further comprising assigning the object identifier in combination with a title of the placeholder link.

11. The method of claim 7, wherein the placeholder page is associated with a wiki network site.

12. The method of claim 7, wherein the placeholder page is associated with a server-based notebook.

13. The method of claim 7, further comprising creating the placeholder link using syntax that triggers a syntax algorithm to tag the placeholder link with the object identifier.

14. The method of claim 7, further comprising denoting the placeholder link with a non-existent target page.

15. The method of claim 7, further comprising resolving the placeholder link offline in a same way as resolving the placeholder link online.

16. The method of claim 7, further comprising identifying that at least two placeholder pages belong to the same placeholder link.

17. A system comprising a processor in electronic communication with computer readable storage media, the computer readable storage media storing instructions that cause the processor to:

using a collaboration environment, include at least one of a network-based wiki or an electronic notebook, for creating a placeholder link in a collaboration document, the placeholder link maps to a non-existent online placeholder page and is a visual cue indicating the online placeholder page;

tag the placeholder link of the collaboration document with an object identifier; generating the online placeholder page in response to selection of the placeholder link to navigate to the online placeholder page;

assign the object identifier to the online placeholder page;

convert the online placeholder page to an online target page upon receiving user content, and replacing the placeholder link with an underlined hyperlink; and synchronize and merge changes of modified target pages, made from copies of the online target page, to the online target page based on the object identifier.

18. The system of claim 17, further comprising merge page information of another offline target page to the online target page as part of the synchronization.

19. The system of claim 17, further comprising assign the object identifier to all copies of the target page taken offline and synchronize the copies to the online target page based on the identifier.

20. The system of claim 17, further comprising assign the object identifier in combination with a title of the placeholder link.

\* \* \* \* \*